(12) United States Patent
Maki

(10) Patent No.: US 8,229,623 B2
(45) Date of Patent: Jul. 24, 2012

(54) CAR-MOUNTED IMAGE RECORDING APPARATUS AND IMAGE RECORDING METHOD

(75) Inventor: Shigeru Maki, Osaka (JP)

(73) Assignee: Panasonic Corporation, Osaka (JP)

( * ) Notice: Subject to any disclaimer, the term of this patent is extended or adjusted under 35 U.S.C. 154(b) by 469 days.

(21) Appl. No.: 12/497,116

(22) Filed: Jul. 2, 2009

(65) Prior Publication Data

US 2010/0002080 A1  Jan. 7, 2010

(30) Foreign Application Priority Data

Jul. 2, 2008 (JP) .................................. 2008-173339

(51) Int. Cl.
*G01M 17/00* (2006.01)
*G06F 7/00* (2006.01)
*G06F 19/00* (2006.01)

(52) U.S. Cl. ........................... 701/35; 348/148; 386/109

(58) Field of Classification Search ............ 348/62–167; 701/35, 200, 213; 340/438; 455/344
See application file for complete search history.

(56) References Cited

U.S. PATENT DOCUMENTS

| 5,815,825 A * | 9/1998 | Tachibana et al. ............... 701/23 |
| 7,532,975 B2 * | 5/2009 | Ishikawa ........................ 701/200 |
| 2003/0095182 A1 * | 5/2003 | Imoto ............................ 348/148 |
| 2003/0112132 A1 * | 6/2003 | Trajkovic et al. .............. 340/435 |
| 2005/0123201 A1 * | 6/2005 | Nakashima et al. ........... 382/195 |
| 2005/0222753 A1 * | 10/2005 | Ishikawa ........................ 701/200 |
| 2006/0009188 A1 * | 1/2006 | Kubota et al. .................. 455/344 |
| 2007/0067079 A1 * | 3/2007 | Kosugi ............................ 701/35 |
| 2010/0097470 A1 * | 4/2010 | Yoshida et al. ................ 348/159 |

FOREIGN PATENT DOCUMENTS

| JP | 2000-6854 | 1/2000 |
| JP | 2005-318519 | 11/2005 |
| JP | 2007-88541 | 4/2007 |

* cited by examiner

*Primary Examiner* — Sath V Perungavoor
*Assistant Examiner* — Nathnael Aynalem
(74) *Attorney, Agent, or Firm* — Wenderoth, Lind & Ponack, L.L.P.

(57) ABSTRACT

A car-mounted image recording apparatus comprises an imager operable to take a moving image of outside scene of a vehicle, an image quality controller operable to determine importance of present position of the vehicle, and controlling image quality of the moving image on the basis of the importance, and an image recorder operable to compress the taken moving image so as to obtain image quality controlled by the image quality controller, and record the compressed image in a recording medium.

2 Claims, 16 Drawing Sheets

| LATITUDE | LONGITUDE | ALTITUDE | IMPORTANCE RANK |
|---|---|---|---|
| N35.11108 | E136.54640 | 2 | A |
| N34.87825 | E136.01084 | 5 | B |
| N34.34474 | E135.51484 | 2 | C |
| N34.95351 | E135.80895 | 3 | A |

| TIME | IMPORTANCE RANK | IMPORTANT IMAGING POINT |
|---|---|---|
| 05:30:25 | B | SIGNAL |
| 05:30:50 | A | CROSSING |
| 05:32:15-05:33:30 | A | PLATFORM |

*Fig.20*
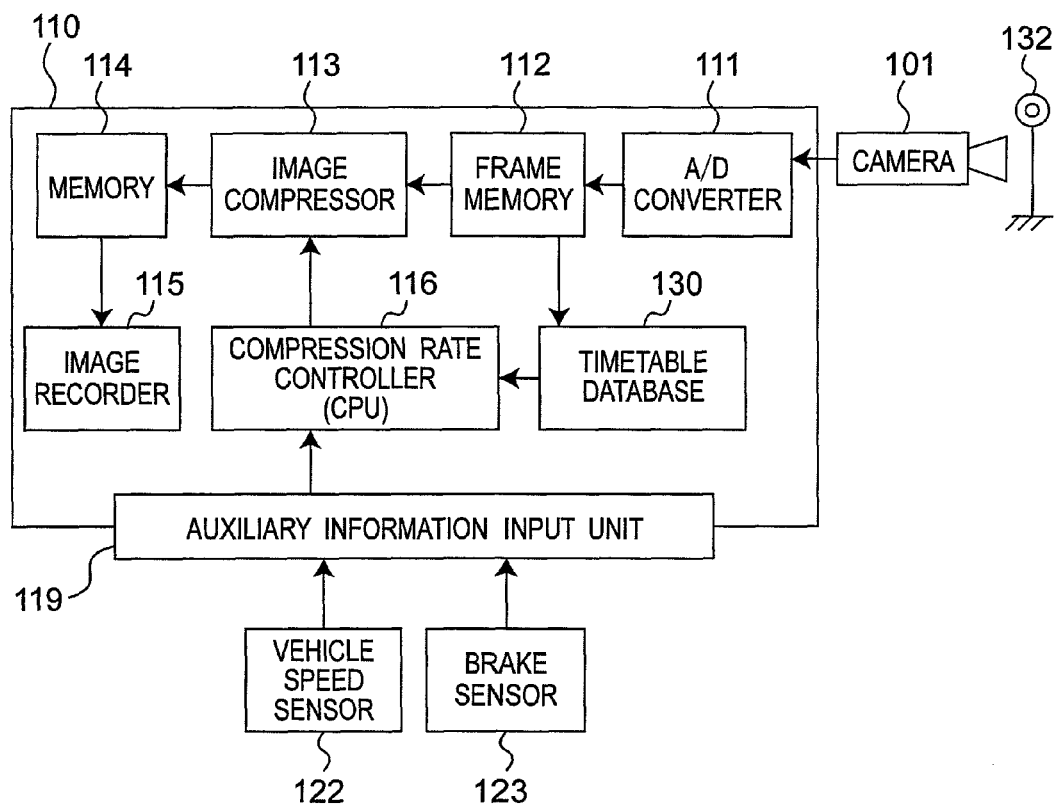
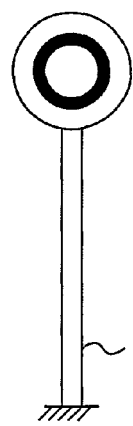
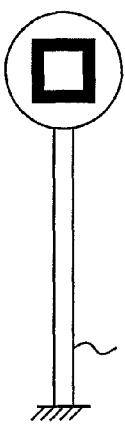
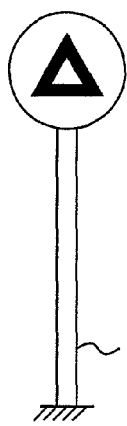
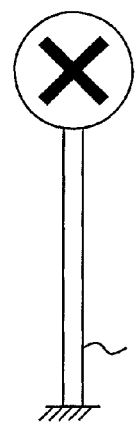
*Fig.21A*　　*Fig.21B*　　*Fig.21C*　　*Fig.21D*

CAR-MOUNTED IMAGE RECORDING APPARATUS AND IMAGE RECORDING METHOD

BACKGROUND

1. Technical Field

The technical field relates to a car-mounted image recording apparatus and an image recording method capable of imaging the outside scene of a vehicle consecutively and recording efficiently on a recording medium.

2. Related Art

JP-A-2000-6854 discloses a vehicle drive recorder operable to record image information by a CCD camera, and sensor information from a vehicle speed sensor, an acceleration sensor and others in a random access memory while updating sequentially, and transferring the recorded information (image and sensor information) in the random access memory by actuation of an impact sensor when the own vehicle receives an impact, to a nonvolatile flash memory, and recording. As a result, in the event of analysis of an accident, the image and sensor information before the accident recorded in the flash memory can be reproduced, and the situation upon occurrence of the accident can be examined.

JP-A-2007-88541 Patent document 2 discloses an automobile drive recorder operable to record consecutively at a low frame rate usually to suppress the cost of the recording medium, and change the frame rate of recorded image when a magnetic sensor detects a sudden approach of other vehicle. As a result, the accident will be clearly recorded, and the image can be recorded clearly not only in an accident accompanied by a strong impact to cause reaction of the impact sensor, but also in a case of slight contact or near collision not causing reaction of the impact sensor.

JP-A-2005-318519 Patent document 3 discloses a car-mount imaging apparatus in which plural cameras are installed in a vehicle (front left, front right, rear left, rear right, rear, etc.), and when reaching a point registered by the driver, the cameras are changed to the one preset by the driver, and the image taken by this camera is displayed on the monitor. As a result, the image in the direction of high risk of accident determined by the driver is displayed, and the risk of traffic accidents can be lowered.

The vehicle drive recorder of JP-A-2000-6854 records only for several tens of seconds before and after the actuation of the impact sensor. Hence, the situation of a further past time cannot be checked, or the image is not recorded in the event of a small impact not actuating the impact sensor or if the collision is nearly avoided.

The automobile drive recorder of JP-A-2007-88541 records consecutively even if all sensors do not react, and records a clear image by reacting to the magnetic sensor (or human body sensor). However, if the time is too short from reaction of the magnetic sensor (or human body sensor) till collision, the process to the collision may not be recorded clearly, and a collision of an object not reacting to the magnetic sensor (or human body sensor) may not be recorded clearly.

The car-mount imaging apparatus of JP-A-2005-318519 has means for registering a point judged to be important, and displays the image of danger point by changing over to the camera directed in the direction of high risk of accident. However, there is no means for recording the taken image efficiently, and if the taken images are recorded consecutively, a recording medium of large capacity is needed.

Recently, car-mounted image recording apparatuses are used widely for the purpose of preventing crime or recording the scene of a traffic accident. Not limited to taxis and transportation trucks, car-mounted image recording apparatuses are also installed in public transportation means (such as electric trains and city buses). In particular, the car-mounted image recording apparatuses installed in public transportation means are desired to record consecutively during business hours (more than ten hours a day) in order to avoid risk of recording failure. However, recording continuously, the storage capacity in the image recording means of the image recording apparatus becomes enormous. Indeed there is inexpensive image recording means of a large capacity such as hard disk drive (HDD), but the image recording means having a drive device is easily disturbed by vibration, and the recording medium to be mounted on a vehicle is desired to have no drive device. The susceptibility to vibration may be overcome by selecting semiconductor memory or other image recording means not having drive device, but the image recording means having semiconductor memory is very expensive. If the images are recorded consecutively at low image quality throughout the business hours, the storage capacity of the recording medium of the image recording means may be small. But if the image quality is poor in the image recorded at the time of an accident, it is hard to determine the cause of the accident correctly.

SUMMARY OF THE INVENTION

In the light of the above problems, it is an object to present a car-mounted image recording apparatus and an image recording method capable of recording images at high image quality useful for analysis of an accident, and suppressing the increase of recording capacity of the recording medium.

In a first aspect, a car-mounted recording apparatus is provided. The car-mounted image recording apparatus includes an imager for taking an outside scene of a vehicle; an image quality controller operable to determining importance of present position of the vehicle, and controlling image quality of moving image on the basis of the importance; and an image recorder operable to compress the taken moving image, and record the compressed image on a recording medium so as to obtain image quality controlled by image quality controller.

In a second aspect, a car-mounted recording method is provided. The image recording method of the invention includes taking an outside scene of a vehicle, determining importance of present position of the vehicle, controlling image quality of a moving image on the basis of the importance, and compressing the taken moving image, and recording the compressed image on a recording medium so as to obtain an image quality controlled on the basis of the importance.

According to the above aspects, the importance of the present position of the vehicle is determined, and the image quality (compression rate, etc.) of the moving image to be recorded is controlled on the basis of this importance. That is, at a point of high risk of occurrence of accident, the moving image is recorded at high image quality, and the image useful for analysis of accident can be recorded, and at a point of low risk of occurrence of accident, the moving image is recorded at low image quality, so that increase of storing capacity of the recording medium can be suppressed.

BRIEF DESCRIPTION OF THE DRAWINGS

FIG. 20 is a block diagram of a car-mounted image recording apparatus in embodiment 7.

FIGS. 21A to 21D are diagrams showing an example of sign.

DETAILED DESCRIPTION OF THE INVENTION

The preferred embodiments are explained below while referring to an electric train as an example of public traffic means together with accompanying drawings.

Embodiment 1

The applicant of this application has noticed that probability of accidents is not always constant in a vehicle moving route. This embodiment relates to a car-mounted image recording apparatus which sets the compression rate lower when the distance between two point of the present position of the vehicle and the pre-stored important imaging point is within a first specified distance, and sets the compression rate higher when the distance between the two points is more than the first specified distance. As a result, at a point with high probability of accidents, the image is recorded at high image quality at low compression rate so that the cause of accident can be analyzed easily, and at a point of low probability of accidents, the image is recorded at low image quality at high compression rate so that the recording space of the recording medium can be saved.

[Configuration of Car-Mounted Image Recording Apparatus]

Figures 1, 2:
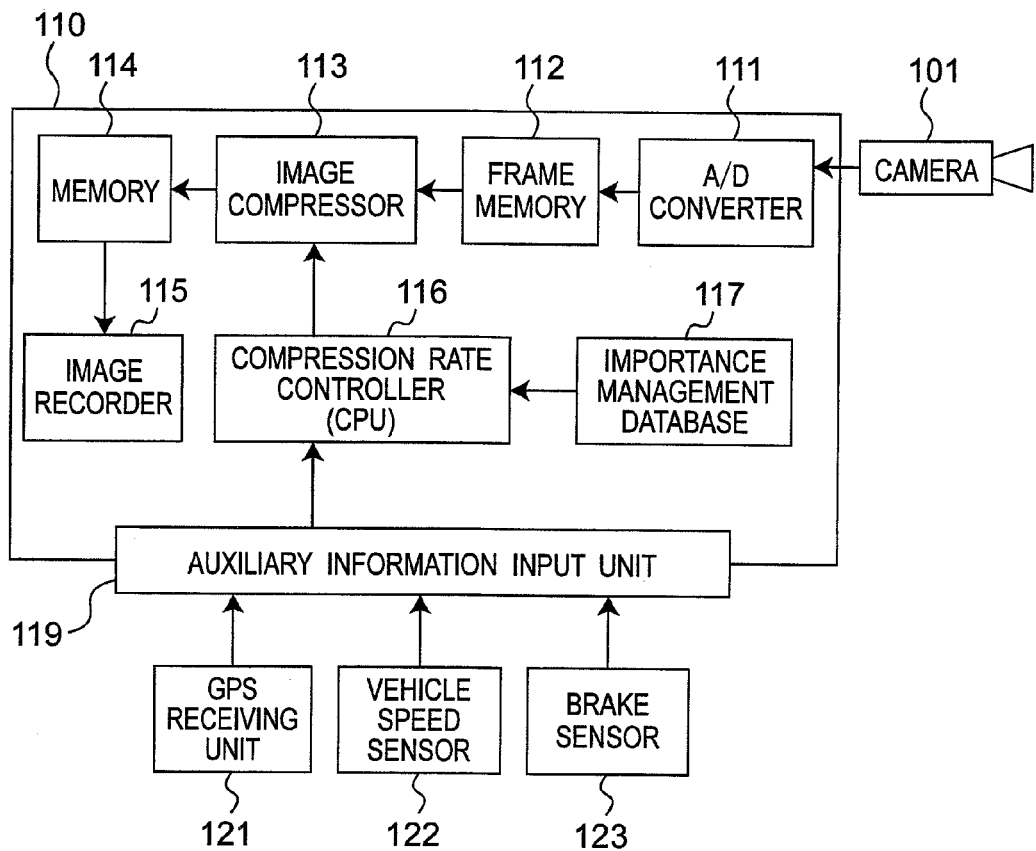
FIG. 1 is a block diagram of a car-mounted image recording apparatus in embodiment 1.
FIG. 2 is a diagram showing an example of importance management database.

FIG. 1 is a block diagram of a car-mounted image recording apparatus in embodiment 1. The car-mounted image recording apparatus 110 includes an A/D converter 111, a frame memory 112, image compressor 113, a memory 114, image recorder 115, a compression rate controller 116, an importance management database 117, and an auxiliary information input unit 119. The image input from a camera 101 for taking a forward scene of the vehicle is digitally converted by the A/D converter 111, and the digitally converted image data is temporarily stored in the frame memory 112. Further, the image data is digitally compressed by the image compressor 113 at a compression rate (for example, 512 kbps, 1 Mbps, 2 Mbps, 4 Mbps) determined by the compression rate controller 116. The compressed image data is temporarily stored in the memory 114, and is stored in a recording medium by means of the Image recorder 115. The Image recorder 115 is resistant to vibration, and has a non-volatile semiconductor memory as the recording medium.

On the other hand, a GPS receiving unit 121 receives a GPS wave, a vehicle speed sensor 122 detects the present vehicle speed, and a brake sensor 123 detects the brake. The auxiliary information input unit 119 is an interface operable to receive information from the GPS receiving unit 121, vehicle speed sensor 122, and brake sensor 123, and send it out to the compression rate controller 116. The compression rate controller 161 receives the present position information (latitude, longitude, altitude, etc.) from the GPS receiving unit 121, and receives the present vehicle speed from the vehicle speed sensor 122 every second. The compression rate controller 116 calculates the present position from the latitude and longitude.

Figure 3:
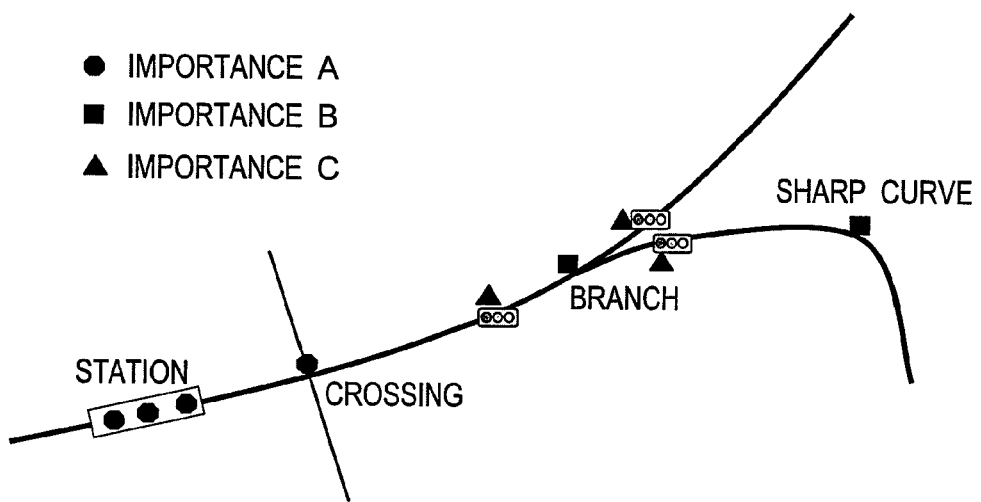
FIG. 3 is a diagram showing an example of vehicle route and important imaging points.

The importance management database 117 stores information of a point considered to be important by the user of the car-mounted image recording apparatus 110, that is, a point with high risk of accident (hereinafter called an "important imaging point"). FIG. 2 shows an example of the importance management database 117. Herein, the latitude, longitude, altitude, and importance rank of the important imaging point are registered. FIG. 3 shows an example of vehicle route and important imaging points. Herein, the vehicle is an electric train. The thick line is the route of the train, and the black circle, black square, and black triangle are important imaging points, respectively. Important imaging point is, for example, a station, a crossing, a signal, a switch, and a sharp curve. The important imaging points may be classified by importance rank. Stations and crossings are accessed by people, so at these places there is highest risk of accident. Therefore the rank of these places is set A (black circle), which is the highest rank. For locations possibly leading to major accident which occurs less frequently such as derailing due to overspeed by handling error by a driver or manager or wrong switching, the rank is set B (black square) which is the middle rank. For locations for which evidence is desired to be recorded for the purpose of checking signal colors and so on when passing there, there is low risk of accident, the rank is set C (black triangle) which is the lowest rank.

[Operation of Car-Mounted Image Recording Apparatus]

Figure 4:
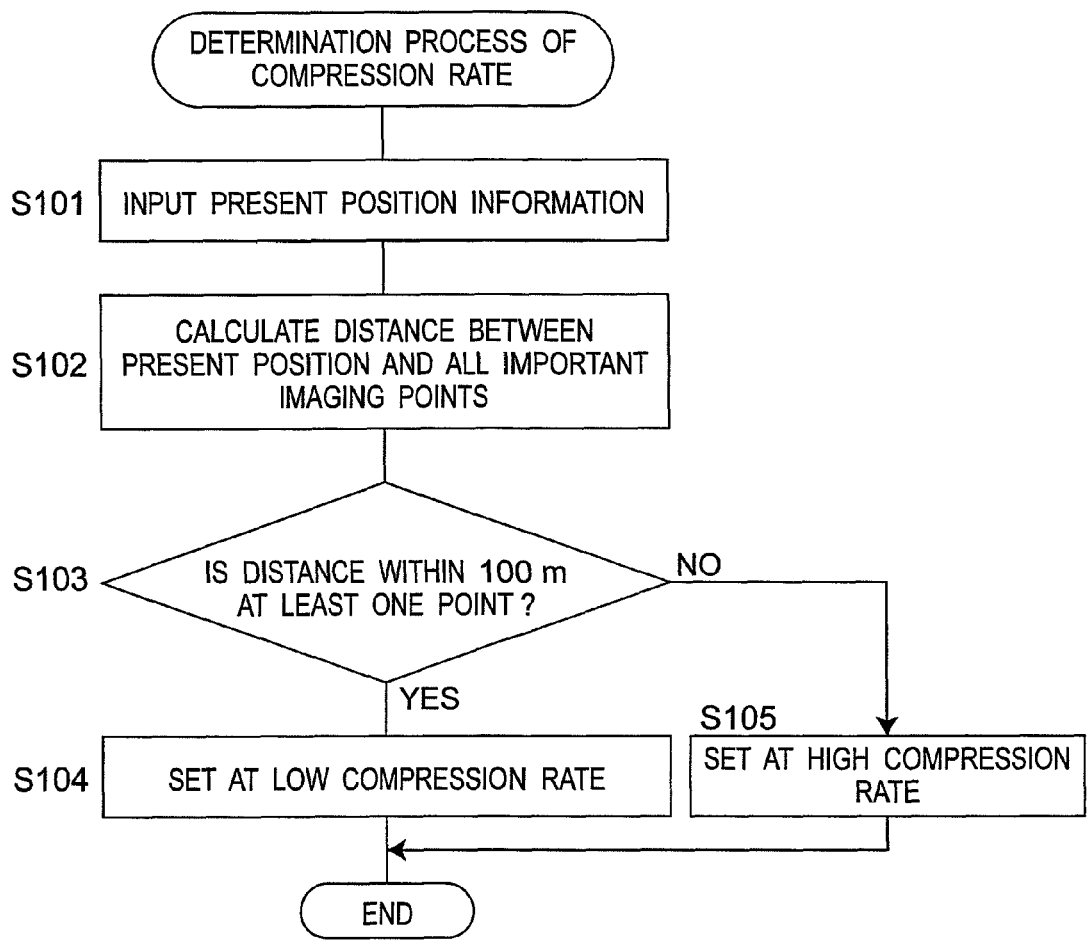
FIG. 4 is a flowchart of operation of compression rate controller in a car-mounted image recording apparatus in embodiment 1.

FIG. 4 is a flowchart of operation of the compression rate controller 116 by the car-mounted image recording apparatus 110 of embodiment 1. The present position information is input to the compression rate controller 116 every second from the GPS receiving unit 121 by way of the auxiliary information input unit 119 (S101). The compression rate controller 116 calculates the distance between the present position and all the important imaging points registered in the importance management database 117, on the basis of the latitude and longitude of the present position and the important imaging points (S102). The formula for calculation of distance between two points is generally known and thus it is not particularly mentioned herein. If the distance between two points is within a first specified distance at least one point (Yes at S103), the compression rate controller 116 requests the image compressor 113 to change the compression rate (for low compression) (S104). Herein, the first specified distance is 100 meters. On the other hand, when the distance between two points is longer than the first specified distance (No at S103), the compression rate controller 116 requests the image compressor 113 to change the compression rate (for high compression) (S105).

The image compressor 113 changes the compression rate then and resumes the compression immediately, at a timing capable of interrupting the compressing operation temporarily, for example, at the end of one frame of image, or at the coding completion point in the group "GOP" unit in the case of moving image compression coding method such as MPEG. The image generated with the compression rate which is changed depending on the distance between the vehicle and an important imaging point is recorded in the recording medium consecutively by the image recorder 115 by way of the memory 114.

At a point remote from an important imaging point, the probability of accident is low, while at a point close to an important imaging point, the probability of accident is high. Accordingly, in the car-mounted image recording apparatus of the embodiment, when the distance between the vehicle and an important imaging point is judged to be long, the probability of accident at that point is regarded to be low, and the image is recorded at high compression rate. When the distance between the vehicle and an important imaging point is judged to be short, the probability of accident at that point is regarded to be high, and the image is recorded at low compression rate. Therefore the image is recorded at low image quality when the probability of accident is low (the importance of image is low), so that the recording capacity of the recording medium may be decreased, and the cost of the apparatus may be lower. Since the image is recorded consecutively, failure of imaging of an accident is avoided. When the probability of accident is high (the importance of image is high), the image is recorded at high quality, and the accident can be analyzed easily.

In the embodiment, the compression rate controller 116 controls the compression rate. Instead, it may be designed to control the frame rate (for example, 10 frames per second) which is the number of images recorded in unit time by a frame rate controller. Alternatively the image resolution (for example, 720×480, 360×240) may be controlled by an image resolution controller. In these manners similarly, the recording capacity of the recording medium can be decreased.

In the embodiment, the vehicle used to explain is an electric train, but it may be a city bus, for example.

In the embodiment, the present position information is obtained from the GPS receiving unit, but the present position information may be also obtained from, for example, a control center.

The embodiment may also include a step of minimizing the compression rate when the brake amount detected by the brake sensor 123 is larger than a specified value.

Embodiment 2

The car-mounted image recording apparatus in embodiment 1 continues to record the image at low compression rate and at high image quality for a long time while the vehicle passes an important imaging point at speed far lower than the assumed speed or while the vehicle stops. In this case, the recording medium is not utilized efficiently. To the contrary, if the vehicle passes at far higher speed than the assumed speed, the image is recorded at high quality only for a short time, so that an accident may not be recorded at a sufficiently high image quality.

In this embodiment, on the other hand, the car-mounted image recording apparatus is characterized by calculating the time required for passing the closest point to an important imaging point, and lowering the compression rate stepwise according to the calculated time, when the calculated time becomes shorter than a first specified time. As a result, the compression rate can be controlled more accurately according to the probability of accident than that of the car-mounted image recording apparatus in embodiment 1, and the image can be recorded in the recording medium more efficiently. The configuration of the car-mounted image recording apparatus of the embodiment is the same as that of embodiment 1, and the explanation is omitted.

[Operation of Car-Mounted Image Recording Apparatus]

FIG. 5 to FIG. 8 are flowcharts of operation of the compression rate controller in the car-mounted image recording apparatus of embodiment 2. The GPS receiving unit 121 can obtain the running direction of the vehicle based on the difference between the previously measured (for example, 1 second before) present position and the newly measured present position. The present position information and the vehicle running direction are input to the compression rate controller 116 every second from the GPS receiving unit 121 by way of the auxiliary information input unit 119. Further, the present vehicle speed is input to the compression rate controller 116 every second from the vehicle speed sensor 122 by way of the auxiliary information input unit 119 (S201). Herein, the present vehicle speed is input from the vehicle speed sensor 122, but it may be also input from the GPS receiving unit 121.

The compression rate controller 116 calculates the distance when the vehicle approaches mostly closely to the closest important imaging point among the important imaging points registered in the importance management database 117, on the basis of the latitude and longitude of the present position and the important imaging points, and the vehicle running direction (S202). When the calculated distance is more than a third specified distance, the compression rate controller 116 instructs the image compressor 113 to compress the image at the highest compression rate (512 kbps) regardless of the important imaging point (S211). Herein, the third specified distance is 50 meters. If the closest approaching distance is within 50 meters (Yes at S203), and if the vehicle still approaches the closest important imaging point (Yes at S204), the compression rate controller 116 calculates the closest approach predict time until approaching mostly closely to the closest important imaging point, on the basis of the latitude and longitude of the present position and the important imaging points, and the vehicle running direction, and the present vehicle speed (S205).

In the embodiment, important imaging points in the importance management database 117 are classified three stages of importance as shown in FIG. 2. For example, the image of the rank A point is highest in importance, and the importance of image is lower in the order of rank B, rank C. The compression rate controller 116 changes the compression rate in four stages (512 kbps, 1 Mbps, 2 Mbps, 4 Mbps) on the basis of the calculated closest approach predict time and the importance rank.

Figure 6:
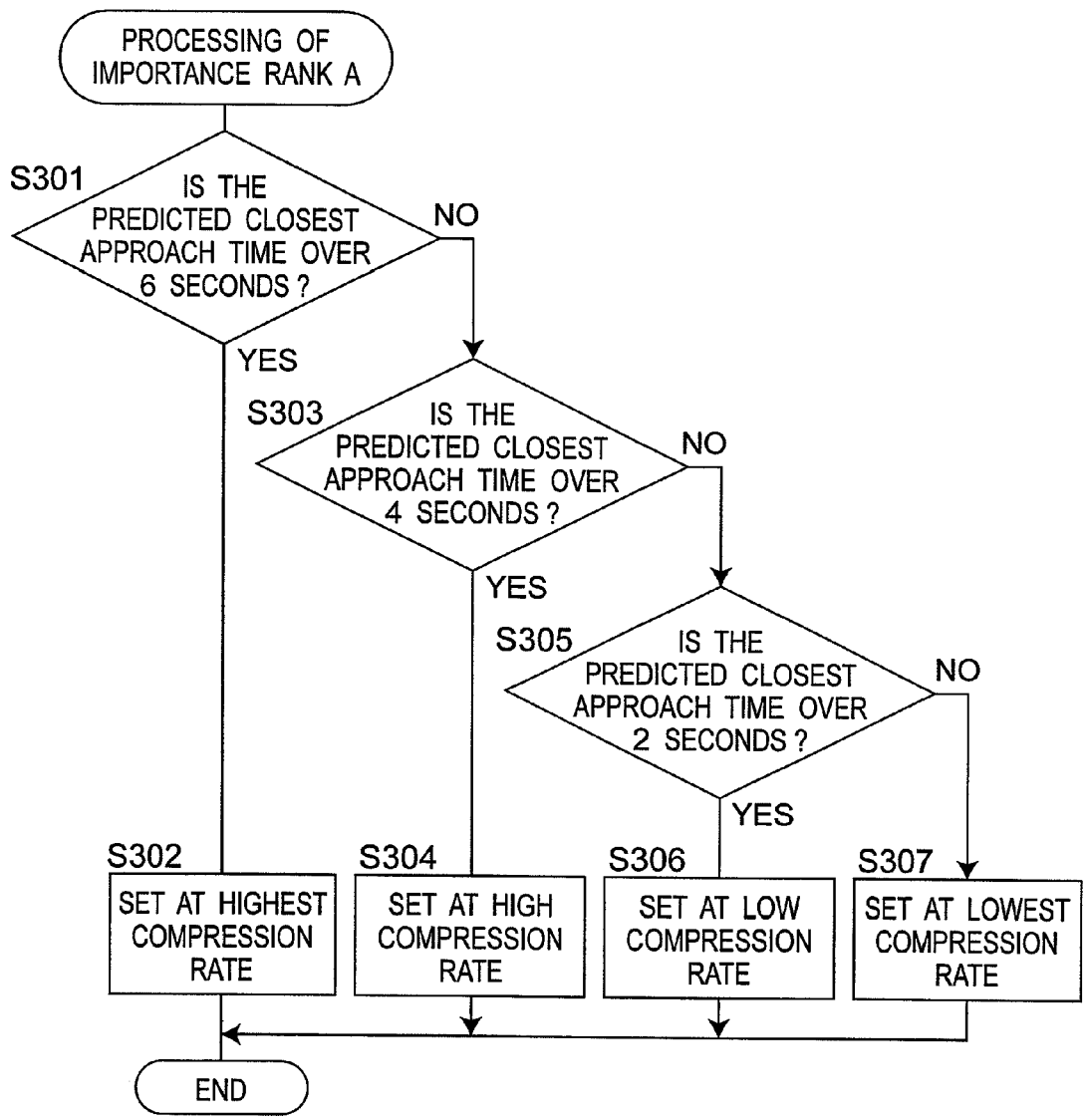
FIG. 6 is a flowchart of process of importance rank A at step S207 in FIG. 5.

When the importance rank of the closest important imaging point is A (Yes at S206), the process goes to step S207 (FIG. 6) for processing at importance rank A. In FIG. 6, when the compression rate controller 116 judges that the closest approach predict time is more than 6 seconds (Yes at S301), it instructs the image compressor 113 to compress the image at the highest compression rate (512 kbps) (S302). When the compression rate controller 116 judges that the closest approach predict time is more than 4 seconds and not more than 6 seconds (Yes at S303), it instructs the image compressor 113 to compress the image at a high compression rate (1 Mbps) (S304). When the compression rate controller 116 judges that the closest approach predict time is more than 2 seconds and not more than 4 seconds (Yes at S305), it instructs the image compressor 113 to compress the image at a low compression rate (2 Mbps) (S306). When the compression rate controller 116 judges that the closest approach predict time is not more than 2 seconds (No at S305), it instructs the image compressor 113 to compress the image at the lowest compression rate (4 Mbps) (S307).

Figure 5:
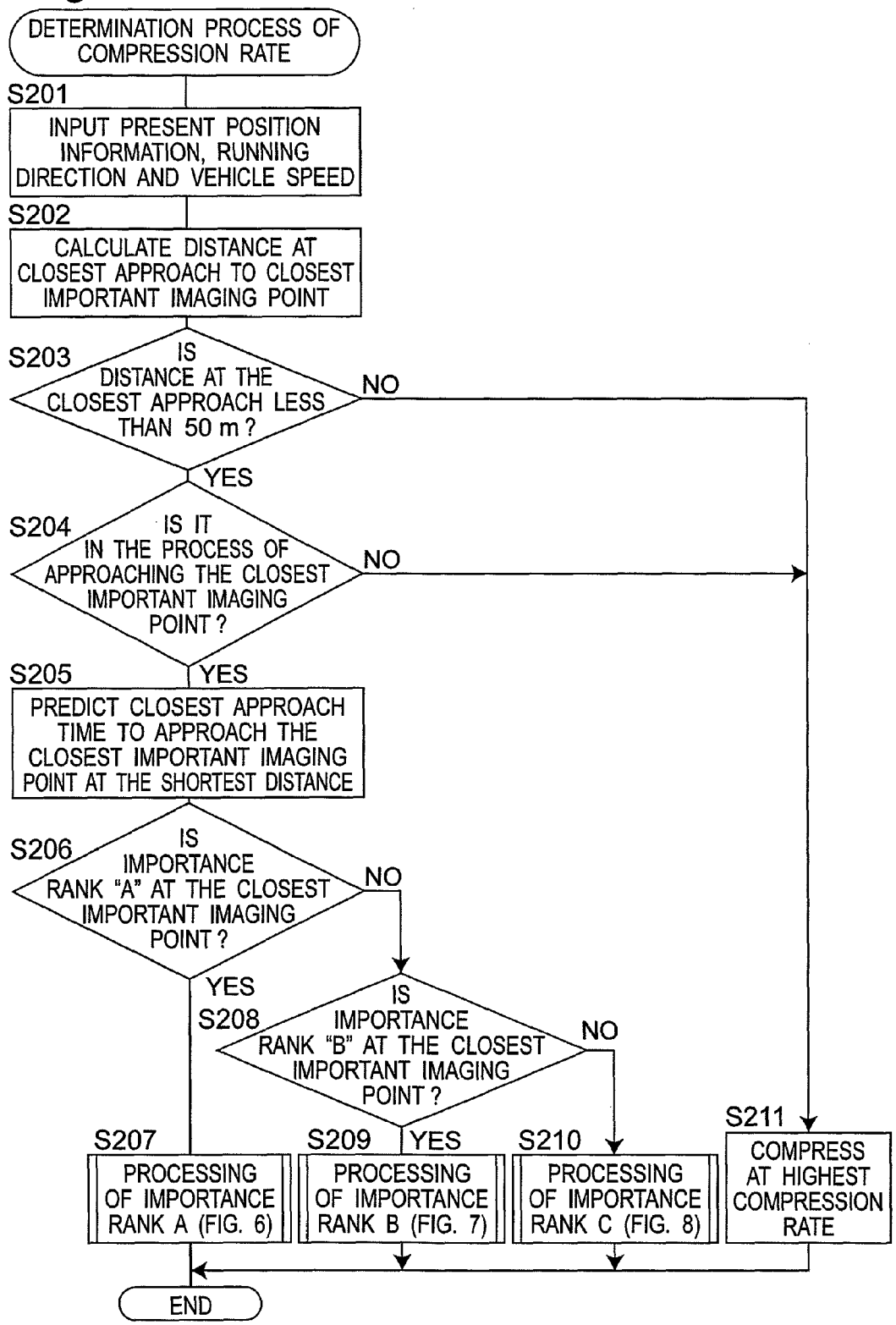
FIG. 5 is a flowchart of operation of compression rate controller in a car-mounted image recording apparatus in embodiment 2.
Figure 7:
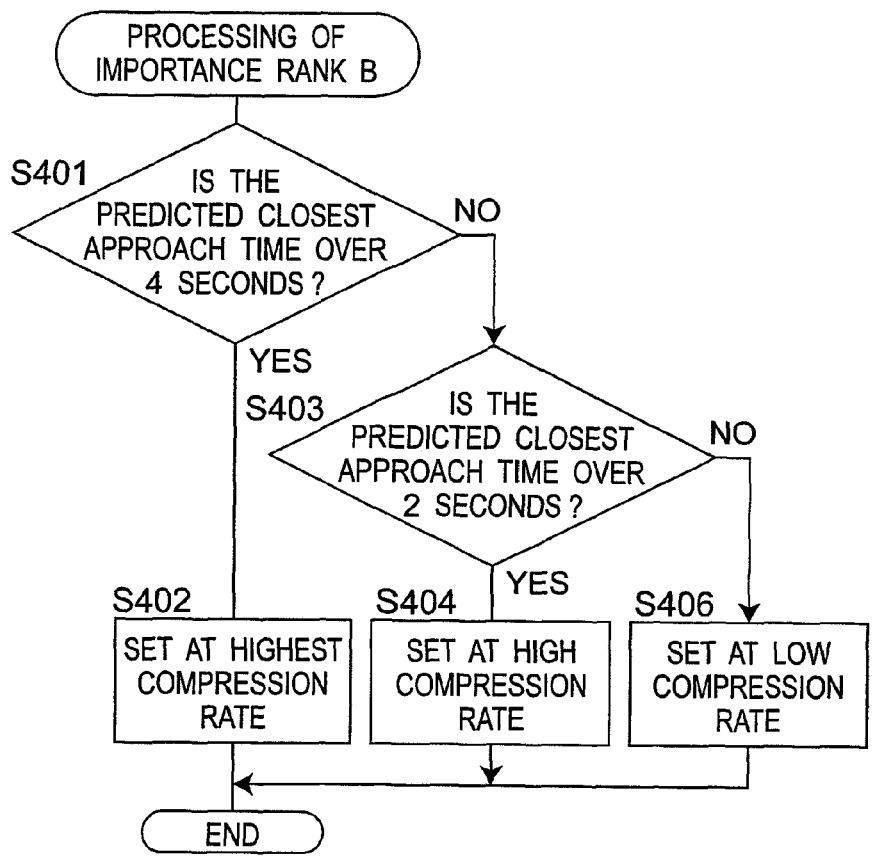
FIG. 7 is a flowchart of process of importance rank B at step S209 in FIG. 5.

Back to FIG. 5, when the importance rank of the closest important imaging point is B (Yes at S208), the process goes to step S209 (FIG. 7) for processing at importance rank B. In FIG. 7, when the compression rate controller 116 judges that the closest approach predict time is more than 4 seconds (Yes at S401), it instructs the image compressor 113 to compress the image at the highest compression rate (512 kbps) (S402). When the compression rate controller 116 judges that the closest approach predict time is more than 2 seconds and not more than 4 seconds (Yes at S403), it instructs the image compressor 113 to compress the image at a high compression rate (1 Mbps) (S404). When the compression rate controller 116 judges that the closest approach predict time is not more than 2 seconds (No at S403), it instructs the image compressor 113 to compress the image at a low compression rate (2 Mbps) (S405).

Figure 8:
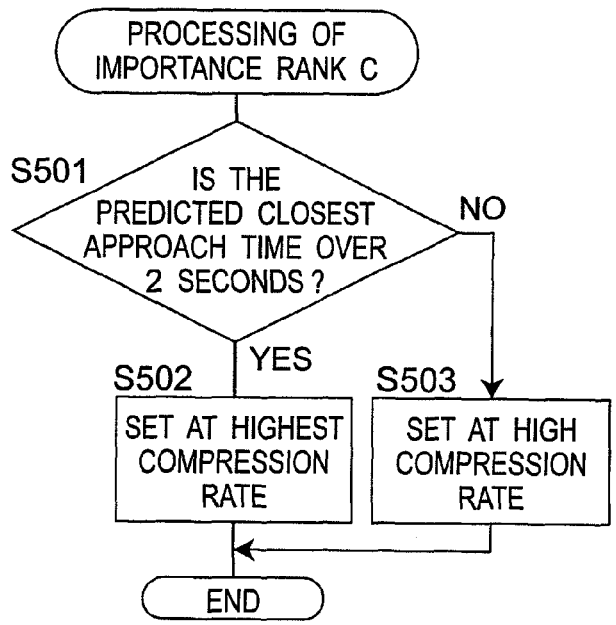
FIG. 8 is a flowchart of process of importance rank C at step S210 in FIG. 5.

Back to FIG. 5, when the importance rank of the closest important imaging point is C (No at S208), the process goes to step S210 (FIG. 8) for processing at importance rank C. In FIG. 8, when the compression rate controller 116 judges that the closest approach predict time is more than 2 seconds (Yes at S501), it instructs the image compressor 113 to compress the image at the highest compression rate (512 kbps) (S502). When the compression rate controller 116 judges that the closest approach predict time is not more than 2 seconds (No at S501), it instructs the image compressor 113 to compress the image at a high compression rate (1 Mbps) (S503).

The important imaging point is a point with high risk of accident, and the image of the important imaging point and the image immediately before this point are important, but the image right after passing this point is not important. Hence, when the vehicle goes away from the most important imaging point (No at S204), the compression rate controller 116 instructs the image compressor 113 to compress the image at the highest rate (512 kbps) (S211).

Figure 9:
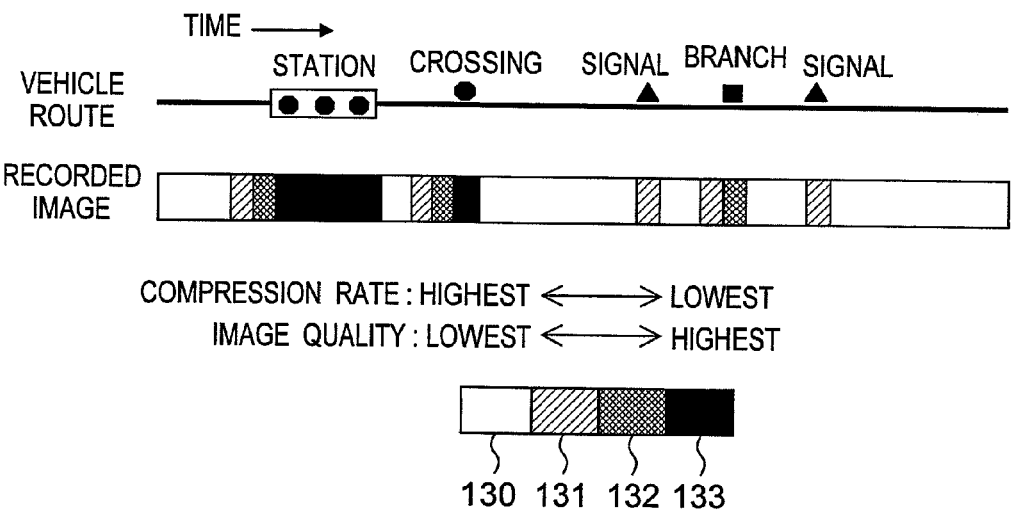
FIG. 9 is a diagram showing compression rate of important imaging points in FIG. 3 and an image input from a camera for imaging forward.

By thus changing the compression rate, images of higher quality are recorded in the recording medium as approaching the important imaging point. A concrete example is shown in FIG. 9. In FIG. 9, the axis of abscissas denotes the time, and the important imaging points in FIG. 3 and the compression rate of the images input from the camera 101 are shown. The highest compression rate is shown by white zone, a high compression rate 131 is shown by oblique line zone, a low compression rate 132 is shown by grating zone, and the lowest compression rate 133 is shown by black zone. When the vehicle approaches the station or crossing (black circle) of importance rank A, the compression rate of the recorded image is changed in four stages. When the vehicle approaches the switch (black square) of importance rank B, the compression rate of the recorded image is changed in three stages. When the vehicle approaches the signals (black triangles) of importance rank C, the compression rate of the recorded image is changed in two stages. Right after the vehicle passes the important imaging points, the compression rate is changed to the highest rate.

The car-mounted image recording apparatus of the embodiment judges the degree of probability of accident by the time until the closest approach to important imaging point and the importance rank of the important imaging point. As a result, as compared with the car-mounted image recording apparatus of embodiment 1, the image is recorded at low image quality when the probability of accident is low, and recorded at high image quality when the probability of accident is high, more accurately. Therefore, on the basis of the running speed and the operation status of the vehicle, the recording capacity of the recording medium can be further decreased. And at the same time, not only the important imaging point but also the adjacent situation can be confirmed at medium image quality.

The car-mounted image recording apparatus of the embodiment controls operable to decrease the recording size by maximizing the compression rate right after the vehicle passes through the important imaging points. As a result, the recording capacity of the recording medium is much smaller.

Embodiment 3

This embodiment relates to a car-mounted image recording apparatus further including a camera for imaging behind the vehicle.

[Configuration of Car-Mounted Image Recording Apparatus]

Figure 10:
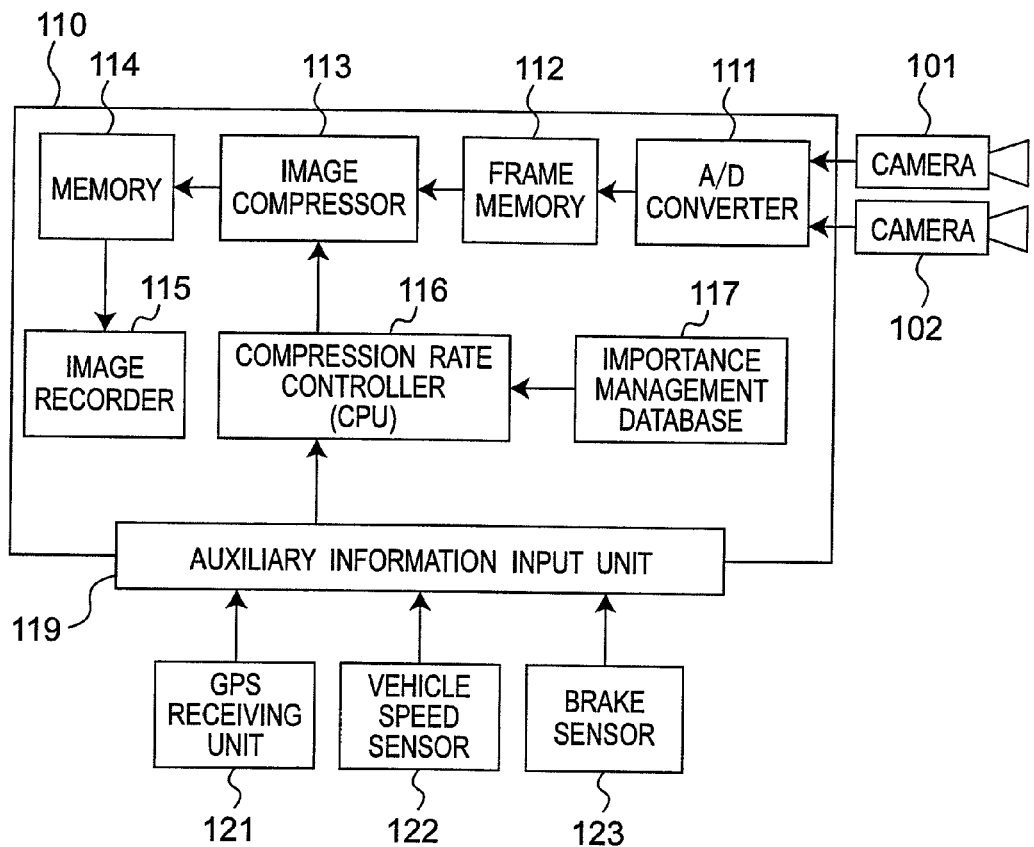
FIG. 10 is a block diagram of a car-mounted image recording apparatus in embodiment 3.

FIG. 10 shows a configuration of the car-mounted image recording apparatus of embodiment 3. The car-mounted image recording apparatus of the embodiment further includes a camera 102 for imaging behind the vehicle. The image input from the rear-view camera 102 is digitally converted in the A/D converter 111. The digitally converted image data is digitally compressed by the image compressor 113 at a compression rate specified by the compression rate controller 116. The compressed image data is recorded in the recording medium by the Image recorder 115. In this embodiment, the change timing is different between the compression rate of the image input from the camera 101, and the compression rate of the image input from the camera 102. The configuration of the car-mounted image recording apparatus of the embodiment is the same as in embodiment 1 except for the camera 102, and the explanation is omitted.

[Operation of Car-Mounted Image Recording Apparatus]

The image input from the front-view camera 101 is compressed at the compression rate determined by the method explained in embodiment 2.

The image input from the rear-view camera 102 is highest in importance at right after the vehicle passes an important imaging point, and is gradually lowered in importance as going further. Therefore, the image input from the rear-view camera 102 should be recorded in a reverse method of the image input from the front-view camera 101. Hence, the image input from the rear-view camera 102 is compressed at compression rate determined by the following method, different from the method explained in embodiment 2.

When the importance rank of an closest important imaging point is A, while the vehicle approaches the closest important imaging point, if the compression rate controller 116 judges that the closest approach predict time is more than 2 seconds, it instructs the image compressor 113 to compress the image at highest compression rate (512 kbps). If the compression rate controller 116 judges that the closest approach predict time is not more than 2 seconds, it instructs the image compressor 113 to compress the image at lowest compression rate (4 Mbps).

While the vehicle goes away from the closest important imaging point, if the compression rate controller 116 judges that the time from the closest approach time is not more than 2 seconds, it instructs the image compressor 113 to compress the image at lowest compression rate (4 Mbps). If the compression rate controller 116 judges that the time from the closest approach time is more than 2 seconds and not more than 4 seconds, it instructs the image compressor 113 to compress the image at low compression rate (2 Mbps). If the compression rate controller 116 judges that the time from the closest approach time is more than 4 seconds and not more than 6 seconds, it instructs the image compressor 113 to compress the image at high compression rate (1 Mbps). If the compression rate controller 116 judges that the time from the closest approach time is more than 6 seconds, it instructs the image compressor 113 to compress the image at highest compression rate (512 kbps).

When the importance rank of the closest important imaging point is B, while the vehicle approaches the closest important imaging point, if the compression rate controller 116 judges that the closest approach predict time is not more than 2 seconds, it instructs the image compressor 113 to compress the image at highest compression rate (512 kbps). If the compression rate controller 116 judges that the closest approach predict time is less than 2 seconds, it instructs the image compressor 113 to compress the image at low compression rate (2 Mbps).

While the vehicle goes away from the closest important imaging point, if the compression rate controller 116 judges that the time from the closest approach time is not more than 2 seconds, it instructs the image compressor 113 to compress the image at low compression rate (2 Mbps). If the compression rate controller 116 judges that the time from the closest approach time is more than 2 seconds and not more than 4 seconds, it instructs the image compressor 113 to compress the image at high compression rate (1 Mbps). If the compression rate controller 116 judges that the time from the closest approach time is more than 4 seconds, it instructs the image compressor 113 to compress the image at highest compression rate (512 kbps).

When the importance rank of the closest important imaging point is C, while the vehicle approaches the closest important imaging point, if the compression rate controller 116 judges that the closest approach predict time is more than 2 seconds, it instructs the image compressor 113 to compress the image at highest compression rate (512 kbps). If the compression rate controller 116 judges that the closest approach predict time is not more than 2 seconds, it instructs the image compressor 113 to compress the image at high compression rate (1 Mbps).

While the vehicle goes away from the closest important imaging point, if the compression rate controller 116 judges that the time from the closest approach time is not more than 2 seconds, it instructs the image compressor 113 to compress the image at high compression rate (1 Mbps). If the compression rate controller 116 judges that the time from the closest approach time is more than 2 seconds, it instructs the image compressor 113 to compress the image at highest compression rate (512 kbps).

Figure 11:
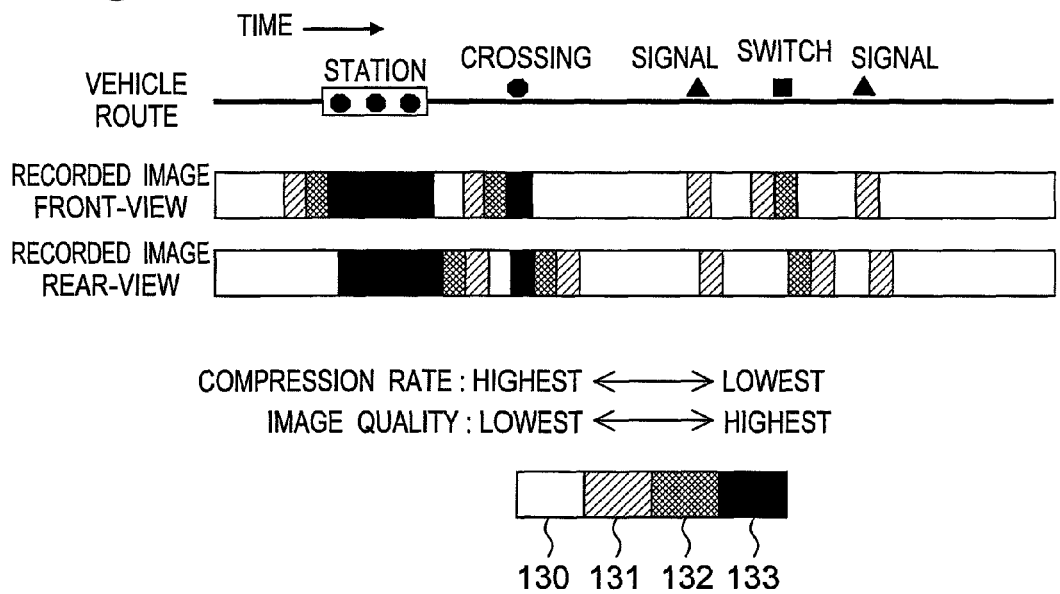
FIG. 11 is a diagram showing compression rate of important imaging points in FIG. 3, and images input from a camera for imaging forward and a camera for imaging backward.

A concrete example is shown in FIG. 11. FIG. 11 shows the compression rate of the image input from the rear-view camera 102 in addition to the content shown in FIG. 9. The change timing is different between the compression rate of front-view recorded image and the compression rate of rear-view recorded image. Immediately before an important imaging point, the compression rate of the rear-view recorded image is lowered. Further, when the vehicle goes away from the station or crossing (black circle) of importance rank A, the compression rate of the rear-view recorded image is changed in four stages. When the vehicle goes away the switch (black square) of importance rank B, the compression rate of the rear-view recorded image is changed in three stages. When the vehicle goes away from the signals (black triangles) of importance rank C, the compression rate of the rear-view recorded image is changed in two stages.

The car-mounted image recording apparatus further includes the camera for imaging behind the vehicle, and the moving image input from this camera is lowered in the compression rate immediately before the vehicle approaches most closely to an important imaging point, and is gradually raised in the compression rate as the vehicle goes away from the important imaging point. As a result, also when the rear-view camera is installed, the image can be recorded efficiently.

Embodiment 4

This embodiment relates to a car-mounted image recording apparatus operable to control the compression rate of moving image to be recorded on the basis of the altitude difference between the present position and an important imaging point, the GPS wave receiving status, the present time, and the vehicle speed, and record the moving image more efficiently.

[Configuration of Car-Mounted Image Recording Apparatus]

Figure 12:
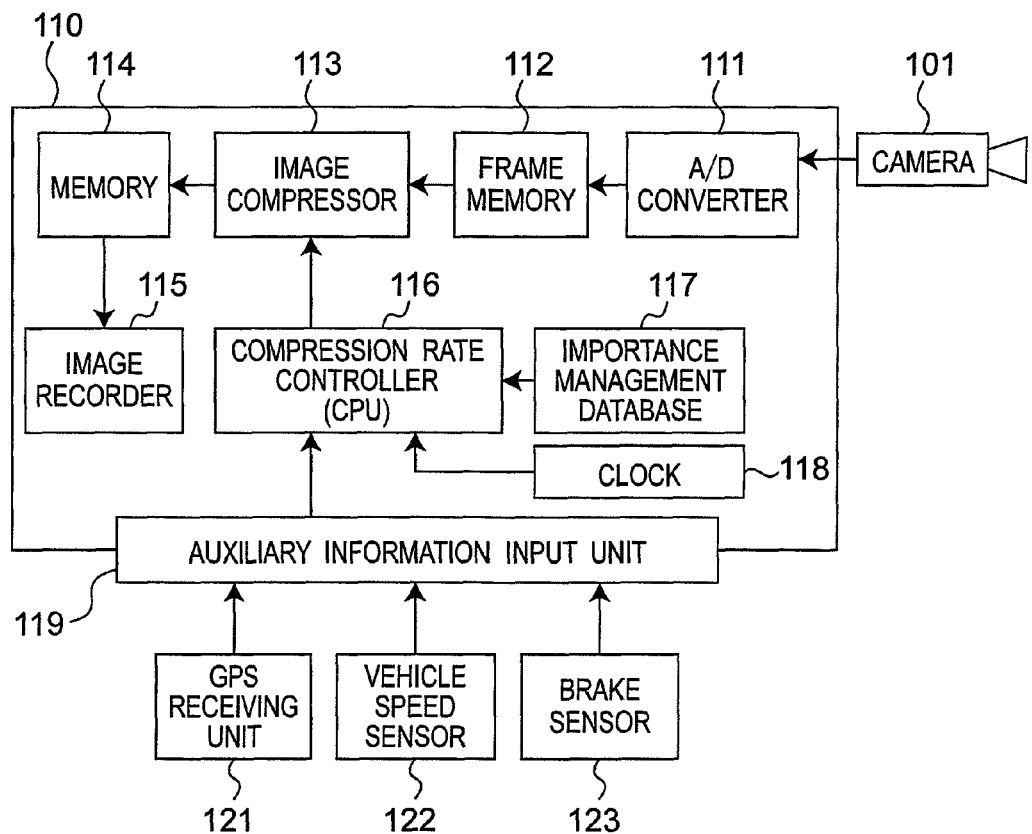
FIG. 12 is a block diagram of a car-mounted image recording apparatus in embodiment 4.

FIG. 12 shows a configuration of the car-mounted image recording apparatus of embodiment 4. The car-mounted image recording apparatus of the embodiment further includes a clock 118 showing the present time. The clock 118 enters the correct present time, and the daytime or nighttime to the compression rate controller 116. The configuration of the car-mounted image recording apparatus of the embodiment is the same as in embodiment 1 except for the clock 118, and the explanation is omitted.

[Operation of Car-Mounted Image Recording Apparatus]

Figure 13:
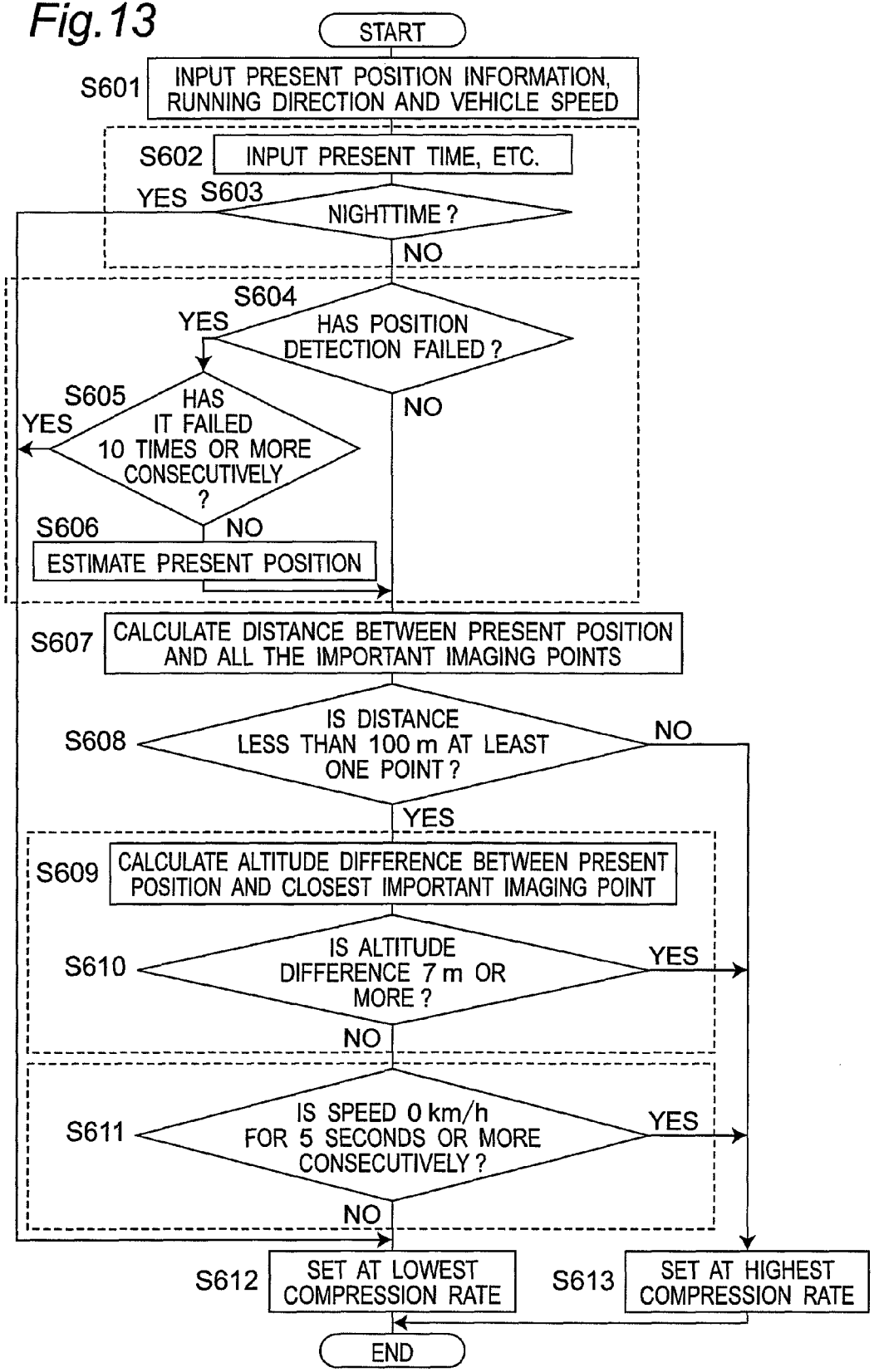
FIG. 13 is a flowchart of operation of compression rate controller in a car-mounted image recording apparatus in embodiment 4.

FIG. 13 shows a flowchart of operation of compression rate controller of the car-mounted image recording apparatus of embodiment 4. The present position information and the vehicle running direction are input every second in the compression rate controller 116 from the GPS receiving unit 121 by way of the auxiliary information input unit 119. The present vehicle speed is input every second in the compression rate controller 116 from the vehicle speed sensor 122 by way of the auxiliary information input unit 119 (S601). The clock 118 notices the correct present time, and the daytime or nighttime to the compression rate controller 116 (S602). The daytime is the present time that is between the sunrise and the sunset, and the nighttime is the present time that is between the sunset and the sunrise.

When the compression rate controller 116 is noticed that the present time is the nighttime (Yes at S603), it estimates that the dark and less visible state continues. Hence, the compression rate controller 116 ignores approaching of important imaging point registered in the importance management database 117, and instructs the image compressor 113 to compress the image at lowest compression rate (4 Mbps) (S612). As a result, the image is recorded at high image quality, and the image of a dark place may be emphasized in the contrast of the image. Further, as compared with an image of a bright place, the image of a dark place is suppressed in the recording size, and the capacity of recording medium is not increased.

When the compression rate controller 116 is informed that the present time is the daytime (No at S603), it judges if the GPS receiving unit 121 has failed in position detection or not (S604). If the GPS wave is interrupted by a landform, buildings or tunnels, the GPS receiving unit 121 may not receive the GPS wave, and fails in position detection.

If the GPS receiving unit 121 has fails less than 10 times consecutively (No at S605), that is, when the reception failure time is short (less than 10 seconds), the compression rate controller 116 estimates the present latitude and longitude on the basis of the latitude and longitude in the last received GPS wave data, the running direction derived from the last received GPS wave data, the present vehicle speed input from the vehicle speed sensor 122, and the present time input from the clock 118 (S606).

If the GPS receiving unit 121 has fails 10 times or more consecutively (Yes at S605), that is, when the reception failure time is long (10 seconds or more), the compression rate controller 116 instructs the image compressor 113 to compress the image at lowest compression rate (4 Mbps) (S612). If the reception failure time is long, it is hard to estimate the present latitude and longitude as in step S606. The reason of reception failure may be considered to be entering into station terminal building or tunnels, or getting into places where the GPS waves are blocked, such as a landform surrounded by mountains or tunnels. In the former case, the possibility that the effects of accident may be serious is high, and it is required to compress the image at low compression rate, and in the latter case, it is estimated that the dark and less visible state continues, and the image is required to be compressed at low rate. Further, same as in nighttime recording, the image of a dark place is emphasized in the contrast of the image, and the recording size is suppressed.

The compression rate controller 116 calculates the distance between the detected present position or estimated present position, and all the important imaging points registered in the importance management database 117 (S607). If the distance between two points is within a first specified distance at least one position (Yes at S608), the process goes to step S609. Herein, the first specified distance is 100 meters.

There is a case that among the roads (including railroads) on which the vehicle moves, a general road and an expressway are installed parallel (vertically) at different heights. And there is a case that at a nearby one of the road (railroad), there are signals, stations, crossings, and other important imaging points, but at a nearby other roads (railroads), there is no important imaging point, and the risk of accident is very low near such other roads (railroads). Accordingly, the compression rate controller 116 calculates the altitude difference between the present position and the closest important imaging point (S609). When the altitude difference is at a second specified distance or more (Yes at S610), the compression rate controller 116 does not regard approaching to the important imaging point, and instructs the image compressor 113 to compress the image at highest compression rate (512 kbps) (S613). Herein, the second specified distance is 7 meters. When the altitude difference is less than the second specified distance (No at S610), the process goes to step S611.

The vehicle may be stopped consecutively for a long time due to some reason. Stopping places may be a signal, station or depot. While the vehicle is stopped, there is no need of considering an accident. Therefore, the compression rate controller 116 judges if the vehicle speed is 0 km/h for 5 seconds or more, consecutively (S611). Concretely, the present vehicle speed is input to the compression rate controller 116 every second from the vehicle speed sensor 122, and the compression rate controller 116 judges if the vehicle speed is 0 km/h for five or more times consecutively. When the vehicle speed is 0 km/h for 5 times or more consecutively, that is, when the vehicle has stopped for 5 seconds or more consecutively (Yes at S611), even if the present position is one of the important imaging points registered in the importance management database 117, the possibility of accident is low. Hence, the compression rate controller 116 instructs the image compressor 113 to compress the image at highest compression rate (512 kbps) (S613).

The car-mounted image recording apparatus of the embodiment controls to maintain the highest compression rate to save the recording size, even if the vehicle approaches an important imaging point, as far as the altitude of the present position and the altitude of the important imaging point are widely different.

The car-mounted image recording apparatus of the embodiment controls the compression rate on the basis of the estimated present position, if the GPS receiving unit 121 has fails in position detection, by estimating the present position on the basis of the latitude, longitude, speed and running direction of the previous successful detection and the elapsed time till detection failure. If the GPS receiving unit 121 has fails in position detection more than specified times consecutively, the image is recorded at high quality at lowest compression rate.

The car-mounted image recording apparatus of the embodiment records the image at high quality at lowest compression rate, from the sunset till the sunrise, regardless of the input from the important imaging position storage and the position detector.

The car-mounted image recording apparatus of the embodiment records the image at low quality at highest compression rate, when the vehicle speed is 0 km/h consecutively, for example, for five seconds, regardless of the input from the important imaging position storing means or the position detecting means. As a result, the recording medium may be used more effectively.

In the embodiment, the clock 118 enters the daytime or nighttime together with the correct present time to the compression rate controller 116. But only the correct present time may be input to the compression rate controller 116 from the clock 118, and the daytime or nighttime may be judged on the basis of the present time by the compression rate controller 116.

In the embodiment, at step S605, the compression rate controller 116 judges if the position detection fails 10 times or more consecutively, but the reference number of times is not limited to 10 times. Similarly, at step S611, the compression rate controller 116 judges if the vehicle speed is 0 km/h consecutively for 5 seconds or more or not, but the reference time is not limited to 5 seconds.

This embodiment is combined with embodiment 1, but it may be also combined with embodiment 2 or 3.

Embodiment 5

In embodiment 1, on the basis of the position information managed in the importance management database 117, it is judged that the vehicle is approaching an important imaging point, and the compression rate of the moving image to be recorded is controlled. In the car-mounted image recording apparatus of this embodiment 5, approaching to the important imaging point is judged on the basis of the passing time of the vehicle, and the compression rate of the moving image to be recorded is controlled, and the compressed image is recorded.

[Configuration of Car-Mounted Image Recording Apparatus]

Figures 14, 15:
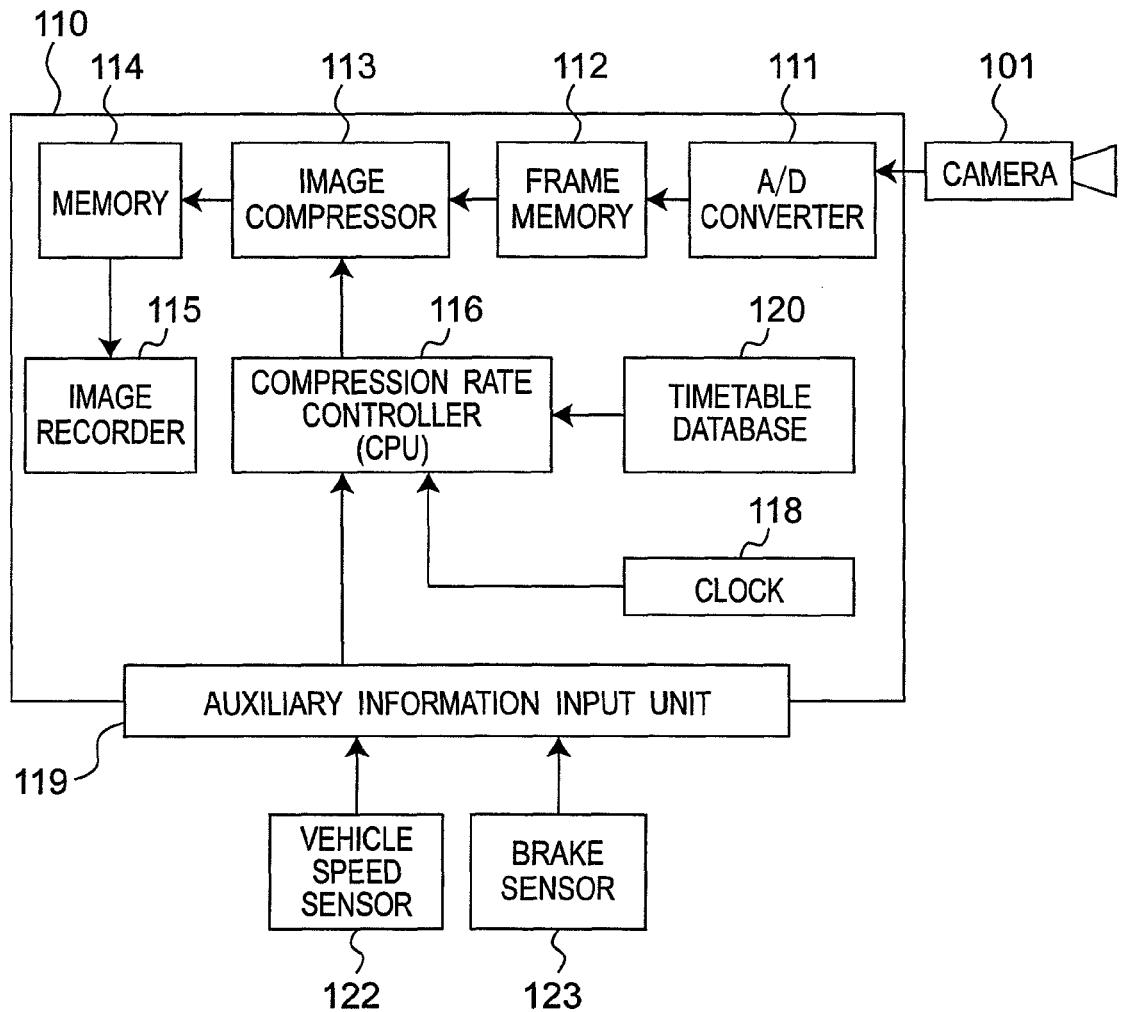
FIG. 14 is a block diagram of a car-mounted image recording apparatus in embodiment 5.
FIG. 15 a diagram showing an example of timetable database.

FIG. 14 shows a configuration of car-mounted image recording apparatus of embodiment 5. The car-mounted image recording apparatus of the embodiment has a timetable database 120 storing the passing time information of important imaging points, and a clock 118 showing the present time, in place of the importance management database 117 and the GPS receiving unit 121 in the configuration of embodiment 1. The clock 118 enters the correct present time into the compression rate controller 116. The other configuration is the same as in embodiment 1, and the explanation is omitted.

In the timetable database 120, the information of passing time of important imaging points is registered. FIG. 15 shows an example of information registered in the timetable database 120. The information includes the time of passing the important imaging points, the importance rank, and the detail of important imaging points. The important imaging points and the importance rank are the same as explained in embodiment 1, and the detailed explanation is omitted.

The compression rate controller 116 determines the importance rank of the present position on the basis of the passing time stored in the timetable database 120 and the present time, and instructs the compression control corresponding to the determined importance rank to the image compressor 113.

[Operation of Car-Mounted Image Recording Apparatus]

Figure 16:
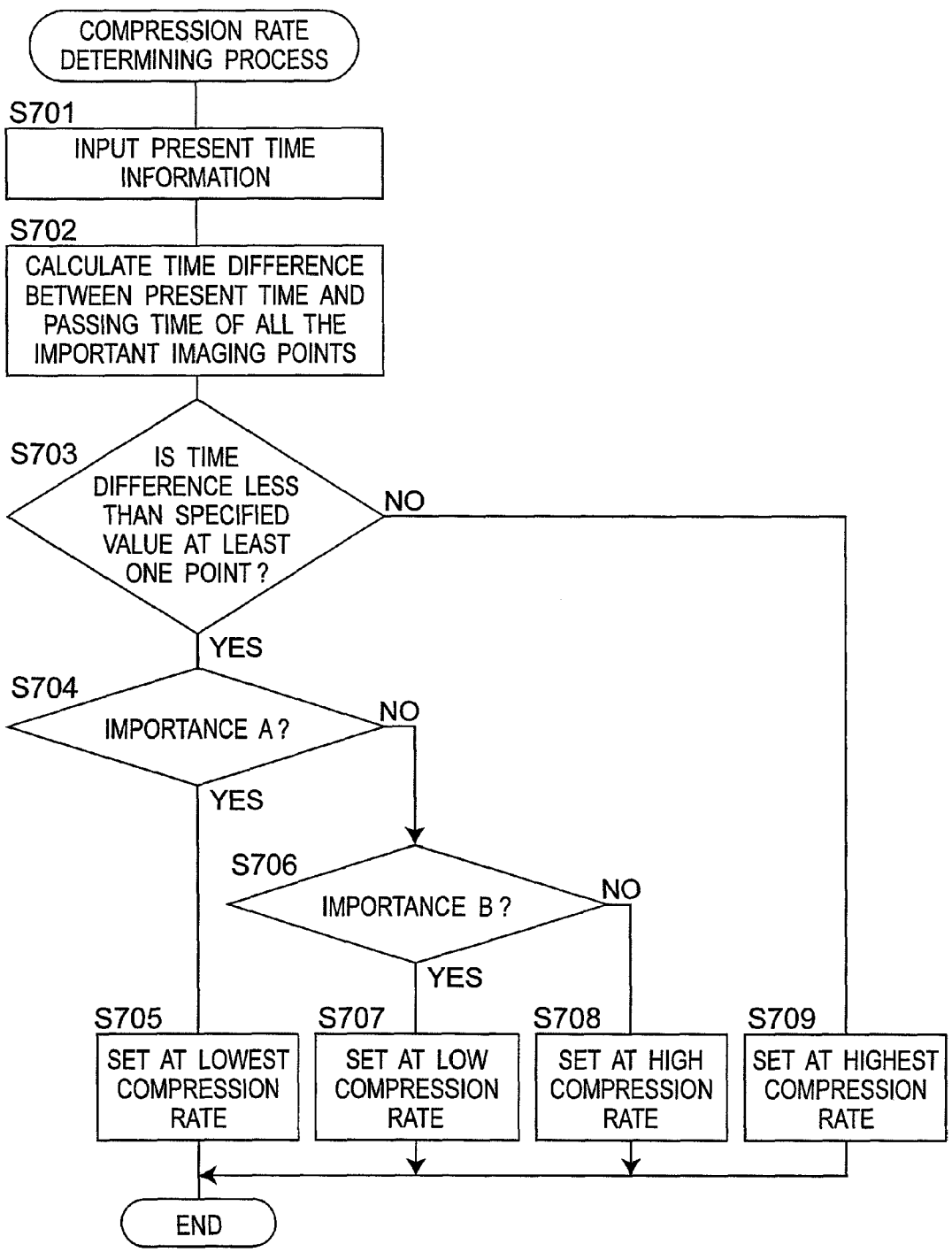
FIG. 16 is a flowchart of operation of compression rate controller in a car-mounted image recording apparatus in embodiment 5.

FIG. 16 shows a flowchart of operation of the compression rate controller 116 of the car-mounted image recording apparatus 110 of embodiment 5. The processing by this flowchart is executed at least once a second. The clock 118 notices the present time to the compression rate controller 116 (S701).

The compression rate controller 116 calculates the time difference between the present time, and the passing time of all important imaging points registered in the timetable database (S702), and judges if the calculated time difference (absolute value) is within a specified value or not, at least one of the important imaging points (S703). Herein, the specified value is, for example, 5 seconds.

If the time difference is not more than the specified value at least one of the important imaging points (Yes at S703), the compression rate controller 116 judges if the importance rank is A or not at the important imaging point judged to be less than the specified value (S704). If the importance rank is A (Yes at S704), the compression rate controller 116 instructs the image compressor 113 to compress the image at lowest compression rate (S705). If the importance rank is not A (No at S704), the compression rate controller 116 judges if the importance rank is B or not (S706). If the importance rank is B (Yes at S706), the compression rate controller 116 instructs the image compressor 113 to compress the image at low compression rate (S707). If the importance rank is not B (No at S706), that is, if the importance rank is C, the compression rate controller 116 instructs the image compressor 113 to compress the image at high compression rate (S708).

On the other hand, at step S702, if the time difference is more than the specified value at any important imaging point (No at S703), the compression rate controller 116 instructs the image compressor 113 to compress the image at highest compression rate (S709).

As explained herein, the car-mounted image recording apparatus of the embodiment has the timetable database 120 for storing the time of passing important imaging points, and determines the importance of the present position on the basis of the passing time stored in the timetable database 120 and the present time. Hence, without requiring the importance management database in embodiments 1 to 4, the importance of present position of the vehicle can be determined in a simple structure. The same as in the foregoing embodiments, the compression rate of the moving image to be recorded can be controlled on the basis of the importance of the important imaging points.

Embodiment 6

This embodiment relates to a car-mounted image recording apparatus operable to control the compression rate of the moving image to be recorded on the basis of signals generated by signal generators installed on important imaging points in the route of the vehicle, compress the taken moving image at the controlled compression rate, and record the compressed image.

[Configuration of Car-Mounted Image Recording Apparatus]

Figure 17:
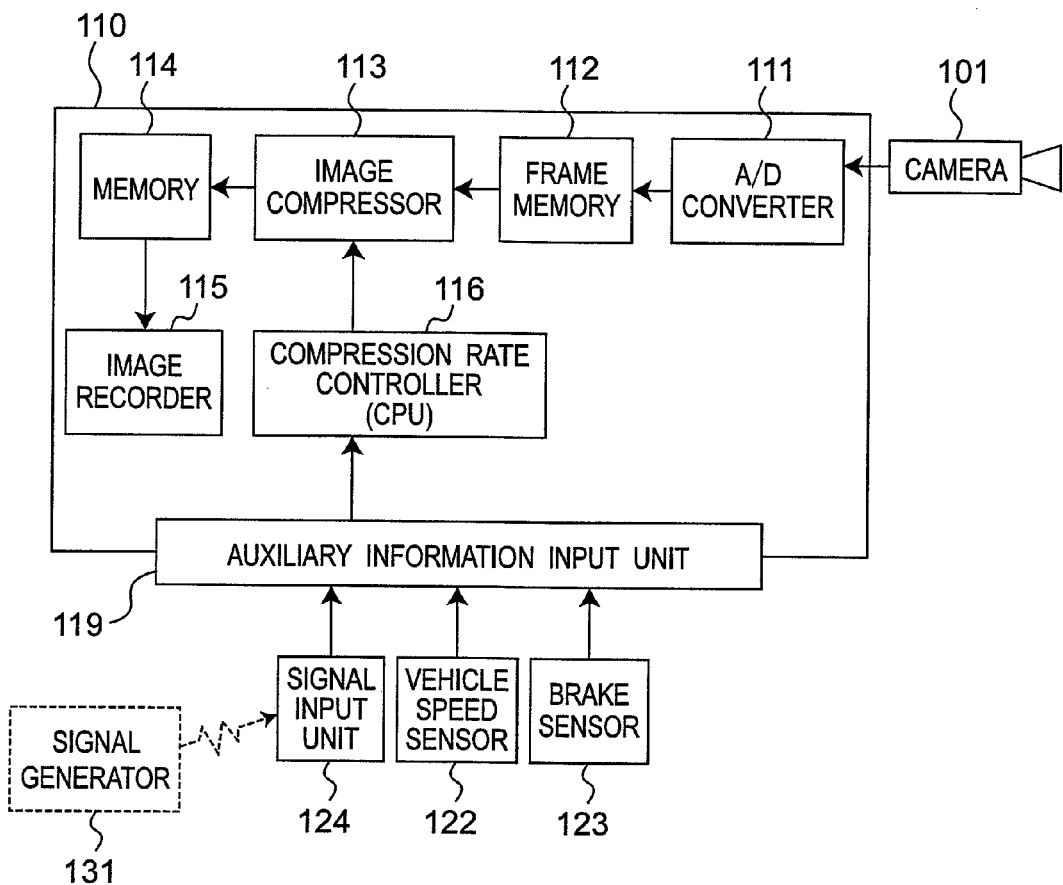
FIG. 17 is a block diagram of a car-mounted image recording apparatus in embodiment 6.

FIG. 17 shows a configuration of car-mounted image recording apparatus of embodiment 6. The car-mounted image recording apparatus of the embodiment has a signal input unit 124 operable to receive the radio wave generated by a signal generator 131 installed at an important imaging point, in place of the importance management database 117 and the GPS receiving unit 121 in the configuration of embodiment 1. The other configuration is the same as in embodiment 1, and the explanation is omitted. The important imaging points and the importance rank are the same as explained in embodiment 1, and the detailed explanation is omitted.

The signal generator 131 is always transmitting radio wave at a specified output modulated according to the importance rank (any one of A, B, C, and D) of the important imaging point at which this signal generator 131 is installed. Importance rank D is anywhere outside of ranks A, B, C in the route of the vehicle in embodiments 1 to 4. As a result, also in this embodiment, the compression rate is controlled in four stages the same as in the foregoing embodiments.

The signal input unit 124 receives the radio wave transmitted by the signal generator 131. The signal input unit 124 outputs the signal received from the signal generator 131 to the compression rate controller 116 by way of the auxiliary information input unit 119. The signal issued from the signal generator 131 contains information showing the importance rank of the point at which the signal generator 131 is installed. Herein, the signal input unit 124 can receive the signal from the signal generator 131 only when coming closer to the signal generator 131 within a specified distance (for example, about 5 meters).

The compression rate controller 116 receives the signal from the signal input unit 124 by way of the auxiliary information input unit 119, and analyzes the received signal to assess the importance rank. The compression rate controller 116 instructs the image compressor 113 to control the compression according to the importance rank.

[Operation of Car-Mounted Image Recording Apparatus]

Figure 18:
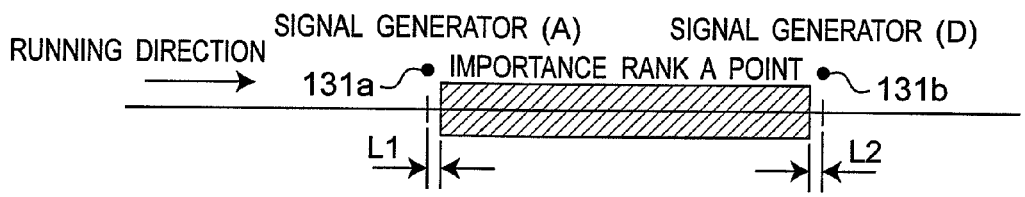
FIG. 18 is a diagram showing an example of layout of signal generator in vehicle route.

FIG. 18 shows an example of layout of signal generators at the important imaging points on the route of the vehicle. In FIG. 18, two signal generators 131a, 131b are installed before and after the important imaging point of importance rank A. The signal generator 131a is disposed behind a first specified distance L1 from the rear end of this important imaging point at running direction, and transmits a signal showing importance rank A. The signal generator 131b is disposed ahead a second specified distance L2 of the front end of this important imaging point at running direction, and transmits a signal showing importance rank D. When the compression rate controller 116 receives a signal showing importance rank A, it instructs the image compressor 113 to start image compressing process according to importance rank A (that is, compression process at lowest compression rate). Later, when the compression rate controller 116 receives a signal showing importance rank D, this unit 116 instructs the image compressor 113 to terminate image compressing process according to importance rank A and start image compressing process according to importance rank D (that is, compressing process at highest compression rate).

The first specified distance L1 and second specified distance L2 are determined in consideration of a range capable of detecting the radio waves from the signal generators 131a, 131b by the signal input unit 124 so that the image of the important imaging point can be taken securely. When the signal generators 131a, 131b are disposed in such layout, if the vehicle approaches the signal generator 131a within the first specified distance L1, the signal input unit 124 issues a signal corresponding to importance rank A received from the signal generator 131a. According to this signal, the compression rate controller 116 instructs the image compressor 113 to change the compression rate (for lowest compression). When the vehicle further advances and approaches to the second specified distance L2 from the signal generator 131b, the signal input unit 124 issues a signal corresponding to importance rank D received from the signal generator 131b. According to this signal, the compression rate controller 116 instructs the image compressor 113 to change the compression rate (for highest compression).

Figure 19:
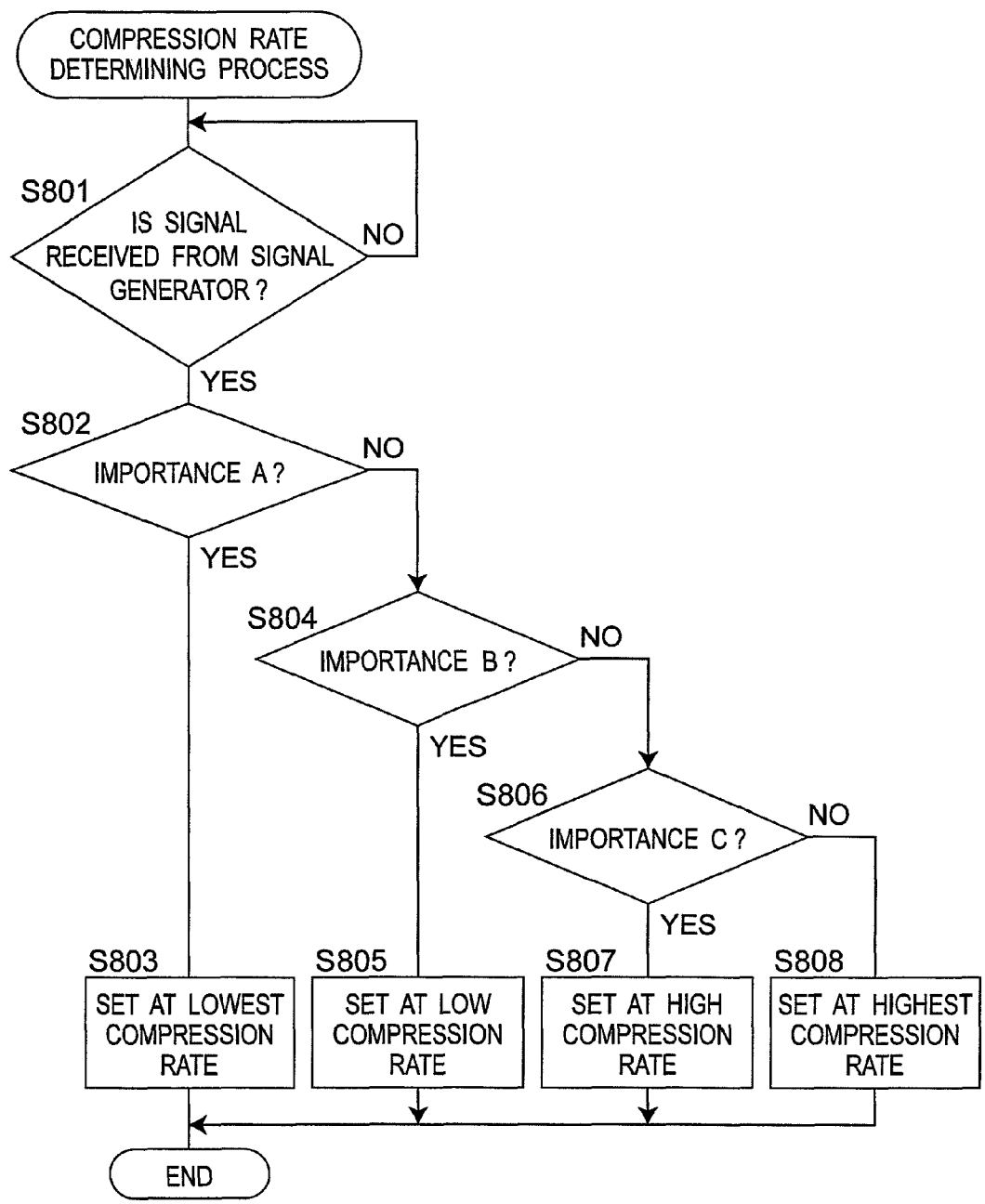
FIG. 19 is a flowchart of operation of compression rate controller in a car-mounted image recording apparatus in embodiment 6.

FIG. 19 shows a flowchart of operation of the compression rate controller 116 of the car-mounted image recording apparatus 110 of embodiment 6.

The compression rate controller 116 judges if the signal is received or not from the signal generator 131 by way of the signal input unit 124 (S801).

When the signal is received from the signal input unit (Yes at S801), the compression rate controller 116 judges if the importance rank shown by the signal is A or not (S802). If the importance rank is A (Yes at S802), the compression rate controller 116 instructs the image compressor 113 to compress the image at lowest compression rate (S803). If the importance rank is not A (No at S802), the compression rate controller 116 judges if the detected importance rank is B or not (S804). If the importance rank is B (Yes at S804), the compression rate controller 116 instructs the image compressor 113 to compress the image at low compression rate (S805). If the importance rank is not B (No at S804), the compression rate controller 116 judges whether or not the detected importance rank is C (S806). If the importance rank is C (Yes at S806), the compression rate controller 116 instructs the image compressor 113 to compress the image at high compression rate (S807). If the importance rank is not C (No at S806), that is, when the importance rank is D, the compression rate controller 116 instructs the image compressor 113 to compress the image at highest compression rate (S808).

As explained herein, in this embodiment, the signal generators 131 are installed at important imaging points, and the car-mounted image recording apparatus receives the signals generated by the signal generators 131 installed at important imaging points, and determines the importance of the present position on the basis of the received result. Hence, without requiring the importance management database in embodiments 1 to 4, the importance of the present position of the vehicle can be determined. The same as in the foregoing embodiments, the compression rate of the moving image to be recorded can be controlled on the basis of the importance of the important imaging points.

Embodiment 7

This embodiment relates to a car-mounted image recording apparatus operable to control the compression rate of the moving image to be recorded on the basis of signs placed on important imaging points in the route of the vehicle, compress the taken moving image to the controlled compression rate, and record the compressed image.

[Configuration of Car-Mounted Image Recording Apparatus]

FIG. 20 shows a configuration of car-mounted image recording apparatus of embodiment 7. The car-mounted image recording apparatus of the embodiment has an image recognition unit 130 for detecting a sign 132 placed on an important imaging point by analyzing the image taken by the camera 101, in place of, the importance management database 119 and the GPS receiving unit 121 in the configuration of embodiment 1. The other configuration is the same as in embodiment 1, and the explanation is omitted. The important imaging points and the importance rank are the same as explained in embodiment 1, and the detailed explanation is omitted.

The sign 132 shows patterns showing the importance rank (any one of A, B, C, and D) of the important imaging point at which this sign is placed. FIG. 21 shows an example of patterns of the sign 132. A sign 132a shown in FIG. 21A is a sign corresponding to importance rank A, and a circle is shown. A sign 132b shown in FIG. 21B is a sign corresponding to importance rank B, and a square is shown. A sign 132c shown in FIG. 21C is a sign corresponding to importance rank C, and a triangle is shown. A sign 132d shown in FIG. 21D is a sign corresponding to importance rank D, and an x-mark is shown.

The image recognition unit 130 analyzes the image taken by the camera 101, and detects the pattern drawn in the signs 132a to 132d. Concretely, the image recognition unit 130 receives the image data taken by the camera 101, and A/D converted by the A/D converter 111 by way of the frame memory 112. The image recognition unit 130 stores the reference patterns corresponding to the circle, square, triangle, and x-mark. The image recognition unit 130 analyzes the received image, and detects the pattern matching with the preliminarily registered reference pattern. The image recognition unit 130, when detecting a pattern matching with the reference image among the input images, issues a signal showing the detected pattern to the compression rate controller 116. The image recognition unit 130 may be also designed operable to detect the pattern only on a pattern larger than a specified size. By considering the pattern size, when the vehicle approaches the sign within a specified distance (for example, 5 m), changing of the compression rate can be started.

The compression rate controller 116 receives the signal showing the detected pattern from the image recognition unit 130, and judges the importance of the point, and instructs the image compressor 113 to control the compression according to the importance rank.

[Operation of Car-Mounted Image Recording Apparatus]

Figure 22:
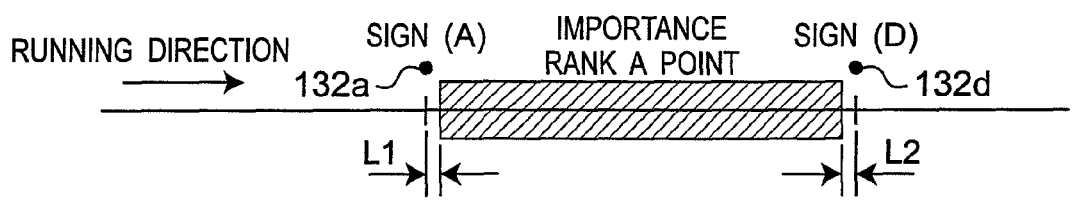
FIG. 22 is a diagram showing an example of layout of sign in vehicle route.

FIG. 22 shows an example of layout of signs at the important imaging points on the route of the vehicle. In FIG. 22, two signs 132a, 132b are placed before and after the important imaging point of importance rank A. The sign 132a is disposed behind a first specified distance L1 from the rear end of this important imaging point at running direction, and a pattern corresponding to importance rank A is drawn. The sign 132d is placed ahead a second specified distance L2 from the front end of this important imaging point at running direction, and a pattern corresponding to importance rank D is drawn. When the compression rate controller 116 detects a pattern showing importance rank A, it instructs the image compressor 113 to start image compressing process according to importance rank A (that is, compression process at lowest compression rate). Later, when the compression rate controller 116 detects a signal showing importance rank D, it instructs the image processing unit 113 to terminate image compressing process according to importance rank A and start image compressing process according to importance rank D (that is, compression process at highest compression rate).

The first specified distance L1 and second specified distance L2 are determined in consideration of the size of the image taken by the camera 101 so that the image at an important imaging point may be taken securely. When the signs 132a, 132b are placed in such layout, if the vehicle approaches the sign 132a, the image recognition unit 130 detects the pattern showing the importance A of the sign 132a among the taken images, and the compression rate controller 116 instructs the image compressor 113 to change the compression rate (for lowest compression). When the vehicle further advances and comes closer to importance rank D, the image recognition unit 130 detects the pattern showing the importance D of the sign 132d among the taken images, and the compression rate controller 116 instructs the image compressor 113 to change the compression rate (for highest compression).

Figure 23:
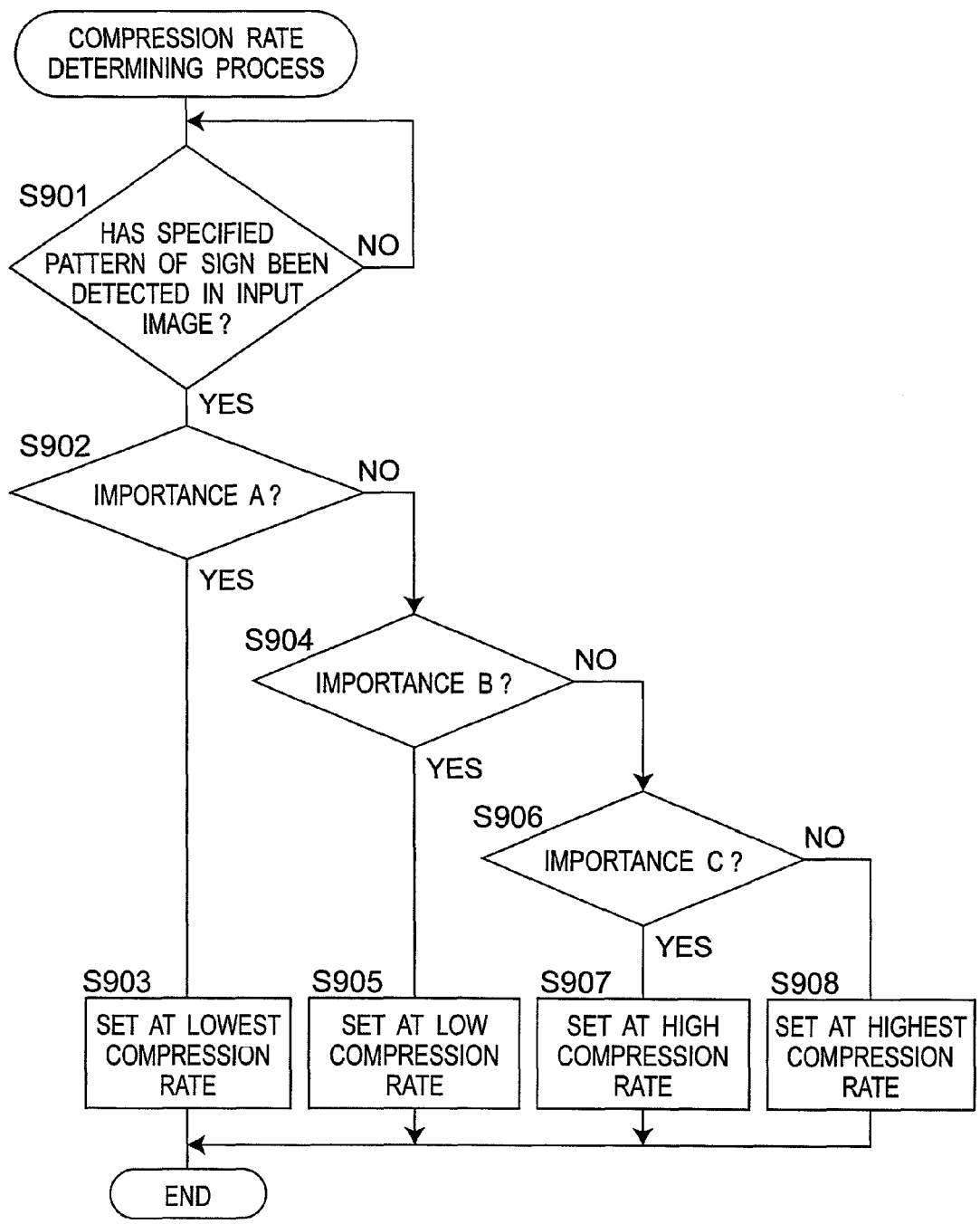
FIG. 23 is a flowchart of operation of compression rate controller in a car-mounted image recording apparatus in embodiment 7.

FIG. 23 shows a flowchart of operation of the compression rate controller 116 of the car-mounted image recording apparatus 110 of embodiment 7.

The compression rate controller 116 judges if the specified pattern of maker 132 is detected or not in the input image on the basis of the input image from the image recognition unit 110 (S901).

When the specified pattern is detected in the input image (Yes at S901), the compression rate controller 116 judges if the importance rank corresponding to the detected pattern is A or not (S902). If the importance rank is A (Yes at S902), the compression rate controller 116 instructs the image compressor 113 to compress the image at lowest compression rate (S903). If the importance rank is not A (No at S902), the compression rate controller 116 judges if the detected importance rank is B or not (S904). If the importance rank is B (Yes at S904), the compression rate controller 116 instructs the image compressor 113 to compress the image at low compression rate (S905). If the importance rank is not B (No at S904), the compression rate controller 116 judges if the detected importance rank is C or not (S906). If the importance rank is C (Yes at S906), the compression rate controller 116 instructs the image compressor 113 to compress the image at high compression rate (S907). If the importance rank is not C (No at S906), that is, when the importance rank is D, the compression rate controller 116 instructs the image compressor 113 to compress the image at highest compression rate (S908).

As explained herein, in this embodiment, the signs 132 are placed at important imaging points, and the car-mounted image recording apparatus analyzes the taken image, detects the pattern of the sign 132 placed at the important imaging point, and determines the importance of the present position of the vehicle on the basis of the importance of the detected pattern. Hence, without the importance management database, the importance of the present position of the vehicle can be determined. Same as in the foregoing embodiments, the compression rate of the moving image to be recorded can be controlled on the basis of the importance of the important imaging points.

INDUSTRIAL APPLICABILITY

The car-mounted image recording apparatus changes the image compression rate to be recorded according to frequency of occurrence of accidents, and records the running mode of the vehicle consecutively. As a result, recording capacity of the recording medium is saved, and missing of recording of the image in the event of an accident is prevented. Further by recording at high definition in a region likely to cause an accident, the cause of accident may be analyzed easily. Consequently the invention is very useful as a car-mounted image recording apparatus and other purposes for imaging the outside scene in front and rear view of the vehicle consecutively and recording efficiently into the recording medium.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2008-173339, filed on Jul. 2, 2008, which is expressly incorporated herein by reference in its entirety.

What is claimed is:

1. A car-mounted image recording apparatus comprising:
an imager operable to take a moving image of an outside scene of a vehicle;
an imaging point storage operable to preliminarily store the position of a specified imaging point, and
a position detector operable to detect a present position of the vehicle,
an image quality controller operable to determine an importance of the present position of the vehicle, and control an image quality of the moving image on the basis of the importance; and
an image recorder operable to compress the taken moving image so as to obtain the image quality controlled by the image quality controller, and record the compressed image in a recording medium,
wherein the image quality controller determines (i) a degree of approach to the imaging point on the basis of (a) the present position of the vehicle detected by the position detector and (b) the position of the specified imaging point stored in the imaging point storage, and (ii) the importance of the present position on the basis of the degree of approach,
wherein the imaging point storage stores an altitude of the imaging point, and
wherein the image quality controller does not change the image quality of the moving image according to the degree of approach when the altitude difference of the present position and the imaging point is not less than a specified distance.

2. A car-mounted image recording apparatus comprising:
an imager operable to take a moving image of the outside scene of a vehicle;
an imaging point storage operable to preliminarily store the position of a specified imaging point, and
a position detector operable to detect a present position of the vehicle,
an image quality controller operable to determine an importance of the present position of the vehicle, and control an image quality of the moving image on the basis of the importance; and
an image recorder operable to compress the taken moving image so as to obtain the image quality controlled by the image quality controller, and record the compressed image in a recording medium,
wherein the image quality controller determines (i) a degree of approach to the imaging point on the basis of (a) the present position of the vehicle detected by the position detector and (b) the position of the specified imaging point stored in the imaging point storage, and
(ii) the importance of the present position on the basis of the degree of approach, and wherein the image quality controller controls the image quality of the moving image to be the lowest quality, regardless of the degree of approach to the imaging point, when the vehicle speed is 0 km/h consecutively for a specified time.

* * * * *